(12) United States Patent
Wang et al.

(10) Patent No.: US 10,216,778 B2
(45) Date of Patent: *Feb. 26, 2019

(54) INDEXING AND SEARCHING HETEROGENOUS DATA ENTITIES

(71) Applicant: INTERNATIONAL BUSINESS MACHINES CORPORATION, Armonk, NY (US)

(72) Inventors: Fei Wang, Ossining, NY (US); Jun Wang, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,526

(22) Filed: Apr. 1, 2016

(65) Prior Publication Data

US 2016/0217135 A1    Jul. 28, 2016

Related U.S. Application Data (63) Continuation of application No. 14/265,828, filed on Apr. 30, 2014, now Pat. No. 9,330,104.

(51) Int. Cl.
  *G06F 7/02* (2006.01)
  *G06F 17/30* (2006.01)

(52) U.S. Cl.
  CPC ...... *G06F 17/3033* (2013.01); *G06F 17/3066* (2013.01); *G06F 17/30097* (2013.01);
  (Continued)

(58) Field of Classification Search
  CPC ......... G06F 17/30097; G06F 17/30864; G06F 17/30244; G06F 17/3033; G06F 17/30914; G06F 17/30339; G06F 16/3066
  See application file for complete search history.

(56) References Cited

U.S. PATENT DOCUMENTS

2005/0251510 A1 * 11/2005 Billingsley ....... G06F 17/30864
2010/0179933 A1    7/2010 Bai et al.
(Continued)

FOREIGN PATENT DOCUMENTS

WO    2003060751 A1    7/2003

OTHER PUBLICATIONS

Ou et al, "Comparing Apples to Oranges: a Scalable Solution to Heterogeneous Hashing," Tsingshua National Laboratory for Information Science and Technology, Department of Computer Science and Technology, Tsingshua University, Beijing, China, IBM Watson Research Center, KDD '13, Aug. 11-14, 2013.*

(Continued)

*Primary Examiner* — Bruce M Moser
(74) *Attorney, Agent, or Firm* — F. Chau & Associates, LLC (57) ABSTRACT

A method of performing a search of heterogeneous data based on an input query includes: generating an index including at least two hash tables, where each hash table corresponds to a different data domain of the heterogeneous data and includes hash code sets, where at least one of the hash code sets is mapped to a hash code set of another one of the tables. The method further includes performing a hash on the input query to generate a hash code, by referring to the index, determining a first hash code set that the generated hash code belongs to, and determining a second hash code set that the determined first hash code set is mapped to, and providing at least one result based on the determined second hash code set.

20 Claims, 6 Drawing Sheets

(52) U.S. Cl.
CPC .. *G06F 17/30244* (2013.01); *G06F 17/30339* (2013.01); *G06F 17/30864* (2013.01); *G06F 17/30876* (2013.01); *G06F 17/30914* (2013.01); *G06F 17/30949* (2013.01)

(56) References Cited

U.S. PATENT DOCUMENTS

| | | | |
|---|---|---|---|
| 2011/0235902 A1* | 9/2011 | Chittar | G06F 17/3025 382/162 |
| 2012/0246130 A1 | 9/2012 | Schmidt | |
| 2012/0330954 A1* | 12/2012 | Sivasubramanian | G06F 9/5061 707/737 |
| 2014/0188893 A1* | 7/2014 | Kobayashi | G06F 17/3033 707/747 |
| 2014/0280041 A1* | 9/2014 | Bosman | G06F 17/30628 707/722 |
| 2014/0317093 A1* | 10/2014 | Sun | G06F 17/3033 707/722 |
| 2015/0143112 A1* | 5/2015 | Yavuz | G06F 17/3033 713/165 |
| 2015/0220600 A1 | 8/2015 | Bellamkonda | |
| 2015/0242429 A1 | 8/2015 | Varvello et al. | |
| 2015/0317323 A1 | 11/2015 | Wang et al. | |

OTHER PUBLICATIONS

Ou, Mingdong et al, "Comparing Apples to Oranges: A Scalable Solution with Heterogeneous Hashing," KDD '13 (ACM SIGMOD Conference on Knowledge Discovery and Data Mining) Aug. 11-14, 2013. (Year: 2013).*

IBM; "Transformation and mapping of textual data to relational data source-entities"; An IP.com Prior Art Database Technical Disclosure; http://ip.com/IPCOM/000154460D; Jul. 2, 2007.

Hung-Chih, Y. et al.; "Traverse: simplified indexing on large map-reduce-merge clusters"; Database Systems for Advanced Applications. Proceedings 14th International Conference, DASFAA 2009.

* cited by examiner

$$\frac{\partial \mathcal{F}^{ho}(\{\mathbf{H}^p\})}{\partial H^p_{ki}} = \sum_j A^p_{ij}(H^p_{ki} - H^p_{kj})$$

$$= (\mathbf{H}^p diag(A^p \mathbf{1}) - (\mathbf{H}^p(X^p)^\top)X^p - \alpha\mathbf{H}^p\mathbf{R})_{ki}$$

$$\frac{\partial \mathcal{F}^{he}(\{\mathbf{H}^p\}, \{\mathbf{W}^{pq}\})}{\partial H^p_{ki}} = \sum_q \sum_j \left[ \sum_g \frac{-R^{pq}_{ij}H^q_{gj}W^{pq}_{kg}}{1 + e^{R^{pq}_{ij}H^q_{gj}(\mathbf{w}^{pq}_g)^\top \mathbf{h}^p_i}} \right.$$

$$\left. + \frac{-R^{qp}_{ji}(\mathbf{w}^{qp}_k)^\top \mathbf{h}^q_j}{1 + e^{R^{qp}_{ji}H^p_{ki}(\mathbf{w}^{qp}_k)^\top \mathbf{h}^q_j}} \right]$$

$$\frac{\partial \theta_1(\{\mathbf{H}^p\})}{\partial H^p_{ki}} = 4((H^p_{ki})^2 - 1)H^p_{ki} = 4((\mathbf{H}^p \odot \mathbf{H}^p - \mathbf{E}) \odot \mathbf{H}^p)_{ki}$$

$$\frac{\partial \theta_2(\{\mathbf{H}^p\})}{\partial H^p_{ki}} = 2\sum_j H^p_{kj} = 2(\mathbf{H}^p\mathbf{1})_k$$

$$\frac{\partial \theta_3(\{\mathbf{H}^p\})}{\partial H^p_{ki}} = 4\sum_j (H^p_k(H^p_j)^\top - m_p I_{kj})H^p_{kj}$$

$$= 4((\mathbf{H}^p(\mathbf{H}^p)^\top - m_p\mathbf{I})\mathbf{H}^p)_{ki}$$

FIG. 4

| Relation-aware Heterogeneous Hashing (RaHH) |
|---|
| Require: $\{\mathbf{X}^p\}$, $\{\mathbf{R}^p\}$, $\{\mathbf{R}^{pq}\}$ <br> Ensure: $\{\mathbf{H}^p\}$, $\{\mathbf{W}^{pq}\}$ <br> 1: initialize $\{\mathbf{H}^p\}$ by CVH and $\{\mathbf{W}^{pq}\}$ as identity matrix <br> 2: initialize S <br> 3: while the value of objective function don't converge do <br> 4:   for each domain $p$ do <br> 5:     for each entity $i$ in domain $p$ do <br> 6:       calculate the gradients with respect to $\mathbf{h}_i^p$ <br> 7:       update $\mathbf{h}_i^p$ by one step gradient descent <br> 8:       update statistics S <br> 9:     end for <br> 10:   for each domain $q$ do <br> 11:     for each bit $k$ of domain $q$ do <br> 12:       calculate gradients with respect to $\mathbf{w}_k^{pq}$ <br> 13:       update $\mathbf{w}_k^{pq}$ by one step gradient descent <br> 14:     end for <br> 15:   end for <br> 16: end for <br> 17: end while |

FIG. 5

Out-of-sample Extension for Relation-aware Heterogeneous Hashing

Require: statistics $\mathbf{S}$, $\mathbf{x}^p_{m_p+1}$, $\mathbf{r}^p_{m_p+1}$, and $\{\mathbf{r}^{pq}_{m_p+1}\}_{q=1}^P$ connected with the out-of-sample entity $v^p_{m_p+1}$

Ensure: $\mathbf{h}^p_{m_p+1}$

1: initialize $\mathbf{h}^p_{m_p+1}$ by CVH
2: while the value of objective function don't converge do
3:   calculate gradients with respect to $\mathbf{h}^p_{m_p+1}$
4:   update $\mathbf{h}^p_{m_p+1}$ by one step gradient descent
5: end while

FIG. 6

INDEXING AND SEARCHING HETEROGENOUS DATA ENTITIES

CROSS-REFERENCE TO RELATED APPLICATION

This application is a Continuation of U.S. application Ser. No. 14/265,828 filed on Apr. 30, 2014, which is incorporated by reference in its entirety herein.

BACKGROUND

1. Technical Field

The present disclosure relates to indexing and searching of heterogeneous data, and more particularly to searching and indexing of heterogeneous data using hashing.

2. Discussion of Related Art

With the fast growth of heterogeneous social media networks like FACEBOOK, FLICKR, and TWITTER, the study of the interactions across heterogeneous domains has attracted greater attention. These networks are considered heterogeneous because they maintain different homogenous data (e.g., user data, textual posts, image based posts data) and the relationships between them (e.g., user A likes comment 1, user B likes photo 2, etc.).

Hashing is a highly scalable indexing strategy for an approximate nearest neighbor search. It encodes data entities into binary hash codes in a Hamming space, where the search can be extremely efficient. In addition, the learned hash functions are usually in a simple form and the generation of hash codes can be done in a real time manner. However, existing hashing technologies are designed for homogeneous data (e.g., data of the same type). Thus, current hashing technologies cannot be applied efficiently to social media networks.

Accordingly, there is a need for methods and systems that can more efficiently search and index heterogeneous data.

BRIEF SUMMARY

According to an exemplary embodiment of the invention, a method of performing a search of heterogeneous data based on an input query includes: generating an index including at least two hash tables, where each hash table corresponds to a different data domain of the heterogeneous data and includes hash code sets, where at least one of the hash code sets is mapped to a hash code set of another one of the tables. The method further includes performing a hash on the input query to generate a hash code, by referring to the index, determining a first hash code set that the generated hash code belongs to, and determining a second hash code set that the determined first hash code set is mapped to, and providing at least one result based on the determined second hash code set.

According to an exemplary embodiment of the invention, a method of generating an index to perform a search of heterogeneous data includes: determining first and second data sub-domains from a first data domain; generating a first hash function that hashes data of the first data sub-domain to a first set of hash codes and a second hash function that hashes data of the second data sub-domain to a second set of hash codes that is different from the first set; generating a first hash table comprising a first element comprising the first set of hash codes and a second element comprising the second set of hash codes; generating a second hash table that comprises hash codes of data from a second data domain different from the first data domain; and mapping one of the elements of the first the first hash table to a hash code of the second hash table.

According an exemplary embodiment of the invention, a computer system is configured to store an index to perform a search of heterogeneous data. The system includes a memory storing the index and a computer program and a processor configured to execute the computer program, The program hashes data of a first data sub-domain of a first data domain to a first set of hash codes and hashes data of a second data sub-domain of the first data domain to a second set of hash codes different from the first set. The index includes a first hash table comprising a first element including the first set of hash codes and a second element including the second set of hash codes, a second hash table comprising hash codes of a second data domain different from the first data domain, and at least one of the elements is mapped to a hash code of the second hash table. The program provides search results based on an input query using the index.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Embodiments of the present invention relates to methods and/or systems that can more efficiently search heterogeneous data.

At least one embodiment of the invention makes use of a Relation-aware Heterogeneous Hashing (RaHH) index for searching large scale heterogeneous data. RaHH utilizes data features of the data, homogenous relationships within each single data domain (e.g., user A like sports, user B likes animals), and heterogeneous relationships across different domains (e.g., user A likes picture 1, user B likes comment 2, etc.) to learn hash functions for each type of data entity, as well as original mappings between the hash codes of different types of data entities.

The goal of RaHH is to learn a Hamming embedding for each type of data and mappings between different Hamming embeddings such that the corresponding hash codes in its relational domains can be retrieved. In this way, given a new query, RaHH can be used to quickly retrieve similar entities in its own data domain as well as similar data entities from other relational domains.

Figure 1:
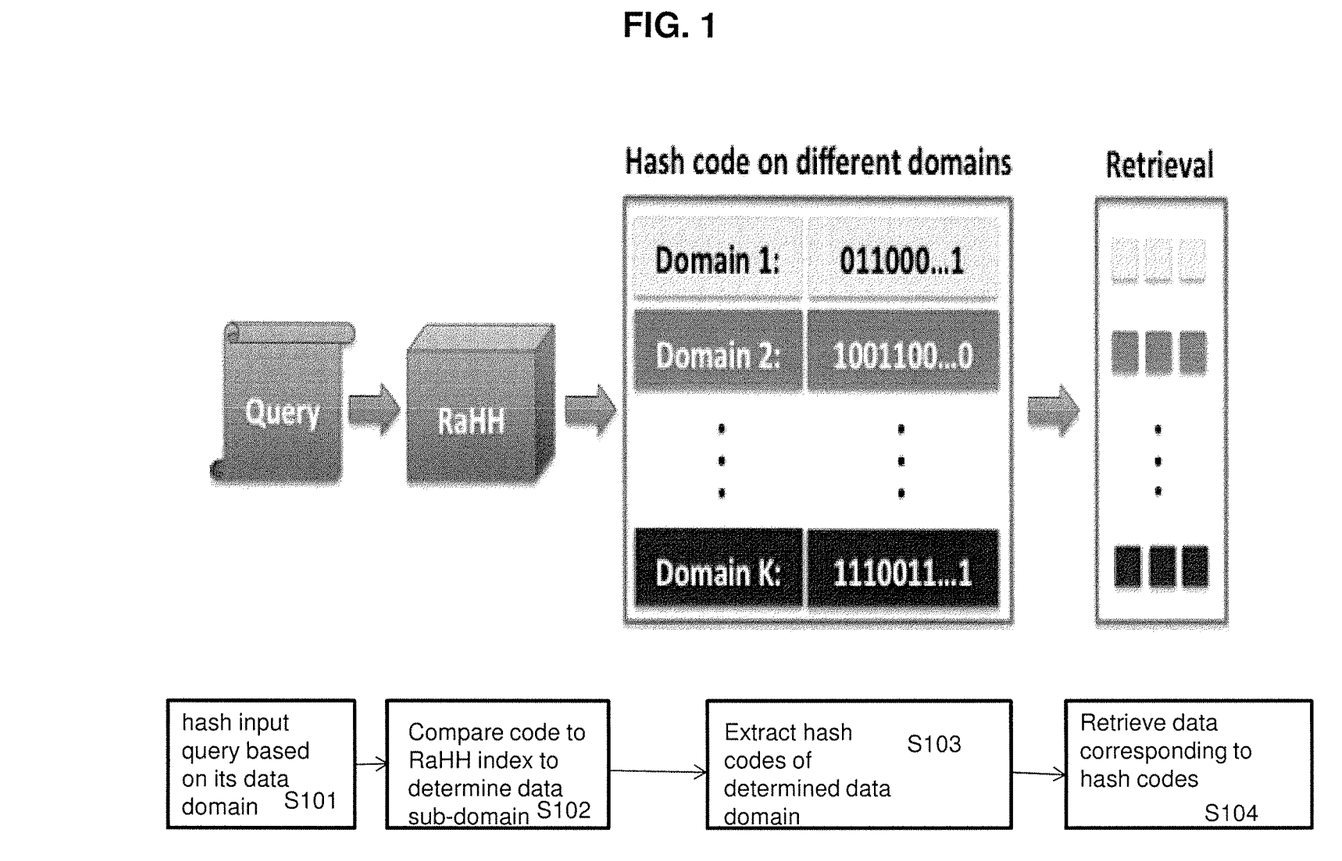
FIG. 1 provides a conceptual diagram of a method of using heterogeneous index to retrieve similar items from heterogeneous domains, according to an exemplary embodiment of the invention.

FIG. 1 provides a conceptual diagram of a method of using RaHH to retrieve similar items from heterogeneous domains, according to an exemplary embodiment of the invention. The method includes performing a hash (e.g., executing a hash function) on a query based on its data domain (S101). For example, if the input query is the identifier of a given user, the corresponding data domain may be referred to as a user data domain, if the input query is a user post such as a post of a picture on the WEB or a post of a comment on the WEB, the corresponding data domain may be referred to as a post data domain. Examples of user posts include posting a FACEBOOK comment or a "like", generating a TWITTER TWEET, posting a picture on various social networks such as FACEBOOK, FLICKR, etc.

The below disclosure will focus primarily on the domains of user data and post data merely for ease of discussion. However, the invention is not limited to these data domains, as additional or substitute data domains may be used, such as an audio data domain, a movie data domain, etc.

The hash function is different depending on the data domain or data sub-domain of the query. Further, the hash function may take into account features about the query so that the resulting hash code is the same or similar to like queries. The hash functions will be described in more detail below.

Next, once the hash code has been determined, the code is compared to a pre-generated RaHH index to determine the data sub-domain of the code (S102). For example, the RaHH index is arranged to include different sets of hash codes or different ranges of hash codes, where each set/range corresponds to a different data sub-domain. A range of hash codes is a number of sequential hash codes. A set of hash codes need not be sequential.

For example, if query includes the identifier of a given user from the user data domain, the RaHH index could include user data sub-domains such as "users that like sports", "users that like cooking", "users that like pets", etc. The user data sub-domains are merely examples, as the invention is not limited to any particular data sub-domain. The corresponding data sub-domain is determined to be that of the data sub-domain associated with the set/range of hash codes that the resulting hash code belongs.

The hash codes of the determined data sub-domain are then extracted (S103). For example, if userA hashed to hash code 1001100, it would correspond to Domain 2 in FIG. 1 and the extracted hash codes could include one or more hash codes in this range such as 1001101, 10011010, 100110111, etc. In this example, the resulting hash codes could correspond to a set of identifiers of users that share similar characteristics to that of the user that was queried on. Thus, a system could use these hash codes to recommend to the user queried on, a list of users with similar interests.

Next, data corresponding to the retrieved hash codes are retrieved (S104). The retrieval includes retrieving all data that has been pre-mapped to the retrieved hash codes. The pre-mapping will be discussed in more detail below. For example, the retrieved hash codes could be mapped to textual comments, pictures, audio files, movie clips, etc. The system could then present one or more parts of the retrieved data to a user based on the query. For example, if the retrieved hash codes are mapped to pictures of Italy, the query including the identifier of the user would return those pictures.

Figure 2:
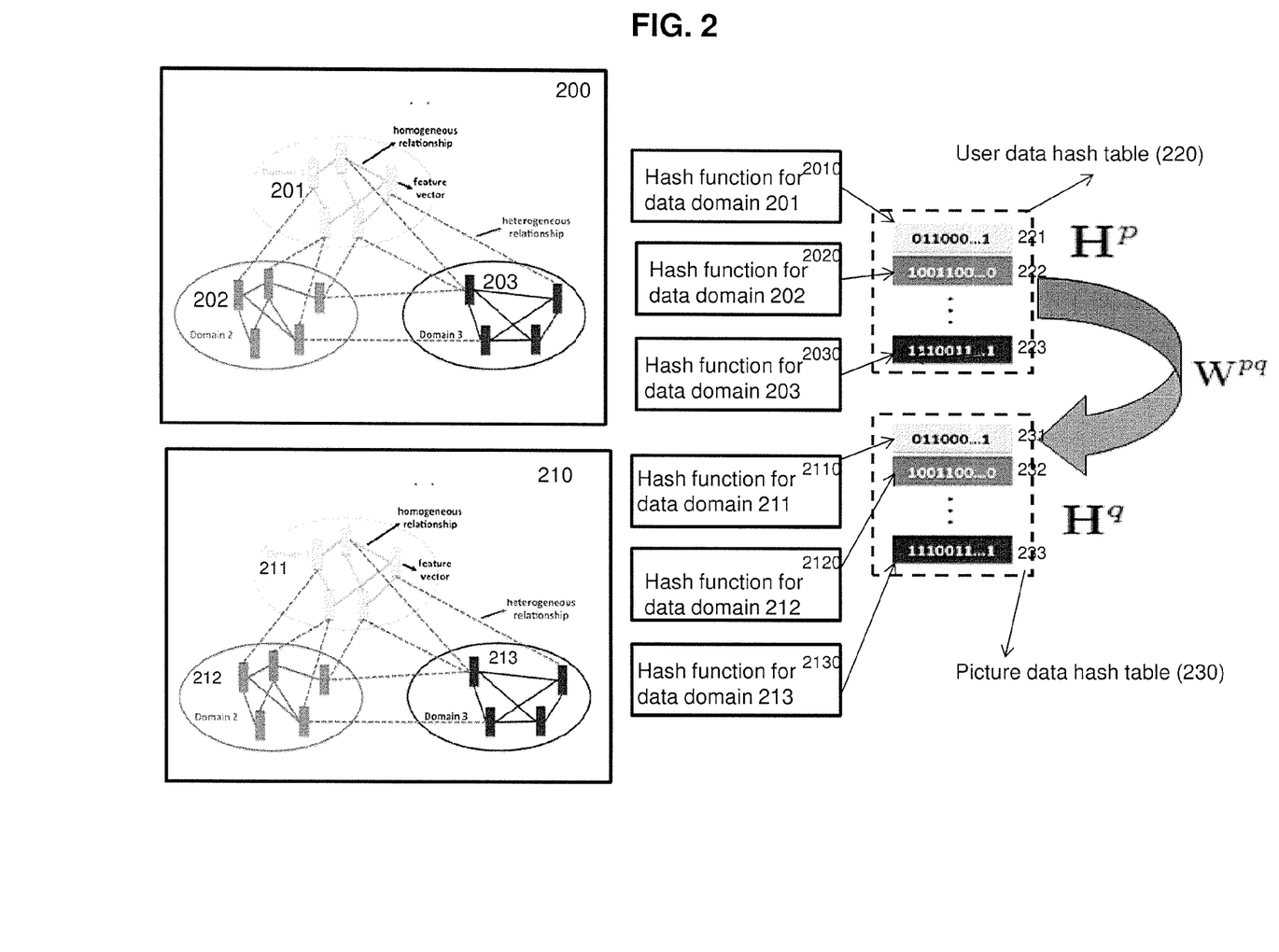
FIG. 2 illustrates a method of generating an index from heterogeneous data according to an exemplary embodiment of the invention.

FIG. 2 provides an example of a user data domain 200 that includes three data sub-domains 201 (e.g., users that like sports), 202 (e.g., users that like animals), and 203 (e.g., users that like to Vacation in Europe), and a post data domain 210 that includes three data sub-domains 211 (e.g., pictures of sports), 212 (e.g., pictures of animals), and 213 (e.g., pictures of European Landmarks). While FIG. 2 illustrates two data domains each having three data sub-domains, the invention is not limited to any particular number of data domains or data sub-domains.

The data domains and sub-domains may be created by inferential analysis of training data. For example, if a user in their social network account had commented about sports using related terms (e.g., soccer, football, hockey, etc.) or indicated they liked (e.g., a FACEBOOK like) sports related stories/advertisements/pictures, they could be put into the data sub-domain that is representative of users that like sports (e.g., 201). In another example, if a user in the social network has commented about animals using related terms (e.g., dog, cat, etc.) or indicated they liked animal related stories/advertisements/pictures, they could be put into the data sub-domain that is representative of users that like animals (e.g., 202). In another example, if a user in the social network has commented about vacationing to Europe using related terms (e.g., France, Italy, etc.) or indicated they liked European related stories/advertisements/pictures, they could be put into the data sub-domain that is representative of users that like Vacationing in Europe (e.g., 203). In another example, if the features extracted from a picture primarily include sports related images (e.g., image of a football, image of a hockey team, etc.), that picture could be put into the data sub-domain that is representative of sports pictures (e.g., 211). In another example, if the features extracted from a picture primarily include animal related images, that picture could be put into the data sub-domain that is representative of animal pictures (e.g., 212). In another example, if the features extracted from a picture primarily include images of European landmarks (e.g., Eiffel Tower, Arc De Triumph, etc.) that picture could be put into the data sub-domain that is representative of pictures of Europe (e.g., 213).

Each data domain includes hash functions for each data sub-domain of that data domain. For example, FIG. 2 illustrates a first hash function 2010 for the first data sub-domain 201 of the first data domain 200, a second hash function 2020 for the second data sub-domain 202 of the first data domain 200, a third hash function 2030 for the third data sub-domain 203 of the first data domain 200, a fourth hash function 2110 for the fourth data sub-domain 211 of the second data domain 210, a fifth hash function 2120 for the fifth data sub-domain 212 of the second data domain 210, and a sixth hash function 2130 for the sixth data sub-domain 213 of the second data domain 210. The first through third hash functions 2010-2030 are used to generate the first hash data table 220 (e.g., a user data hash table) and the fourth through sixth hash functions 2110-2130 are used to generate the second hash table 230 (e.g., a picture data hash table). Each of the data domains 200 and 210 may include additional sub-domains (not shown), which would correspond to additional hash functions in each of the corresponding hash tables.

When the first hash function 2010 is executed on data of the first data sub-domain 201, it produces a hash code in a first hash code range or first hash code set 221, when the second hash function 2020 is executed on data of the second data sub-domain 202, it produces a hash code in a second hash code range or second hash code set 222, when the third hash function 2030 is executed on data of the third data sub-domain 203, it produces a hash code in a third hash code range or hash set 223, when the fourth hash function 2110 is executed on data of the fourth data sub-domain 211, it produces a hash code in a fourth hash range or fourth hash set 231, when the fifth hash function 2120 is executed on data of the fifth data sub-domain 212, it produces a hash code in a fifth hash range or fifth hash set 231, and when the sixth hash function 2130 is executed on data of the sixth data sub-domain 213, it produces a hash code in a sixth hash range or six hash set 233.

In an exemplary embodiment, each of the hash code ranges/sets of a given data domain (e.g., 221-223) include codes that are distinct from one another. In an exemplary embodiment, each of the hash code ranges/sets for all data domains (e.g., 221-223, and 231-233) include codes that are distinct from one another.

The first hash table 220 may be represented by the variable $H^p$ and the second hash table 230 may be represented by the variable $H^q$. A mapping between the first hash table 220 and the second hash table 230 may be represented by $W^{pq}$. An example of a mapping $W^{pq}$ is link, pointer, or connection between one or more elements in the first first hash table 220 and one or more elements in the second hash table 230. These links may be learned from analyzing training data. For example, if the second hash code range/set 222 corresponds to users that like animals, and the training data shows that users that like animals often indicate they like pictures of animals, and the fourth hash code range/set 231 corresponds to pictures of animals, a mapping $W^{pq}$ can be established between the second hash code range/set 222 and the fourth hash code range/set 231. Thus, when a new query is made that identifies a given user as hashing to a code that belongs to second hash code range/set 222, one or more of the pictures of the Animals can be automatically retrieved using the mapping $W^{pq}$ that links to the fourth hash code range/set 231. For example, a search for existing hash codes that are present in the second fourth hash code range/set 231 can be performed, and for each hash code retrieved by the search, its corresponding picture can be retrieved.

While the example of FIG. 2 has been discussed with respect to a first data domain of user data domain and a second data domain of post/picture data, the invention is not limited thereto. For example, the data domains could be swapped, and each of the data domains could be replaced with a different data domain. For example, the post/picture data domain could be replaced with an audio data domain consisting of audio files, where each data sub-domain could be songs by a different artist or from a different genre. Further, while FIG. 2 shows two data domains, additional data domains may be present and thus additional hash tables would be present. Further, while FIG. 2 shows a single mapping $W^{pq}$ between hash code ranges/sets, multiple mappings may be present. For example, one hash code range/set in one hash table of a given data domain may be mapped to two or more hash code ranges/sets in another hash table of a second data domain or to hash code ranges/sets in hash tables of several other data domains.

The RaHH may be formulated as a joint optimization problem over homogeneous data hash codes (e.g., codes in user data hash table 220) and heterogeneous hash code mappings (e.g., a mapping $W^{pq}$) in which data features, homogeneous and heterogeneous relationships are utilized.

In this optimization problem, it is assumed that data items $V = \{V^P\}_{p=1}^P$ are present from P relational domains, where $V^P = \{v_i^p\}_{i=1}^{m_p}$ is the dataset in the p-th domain with $v_i^p$ being the i-th datum. The expression $X^P = \{x_1^p, x_2^p, \ldots, x_{mp}^p\} \in R^{dp \times mp}$ is used to represent the data matrix of the p-th domain, and the expression dp is the dimensionality of the feature space of the p-th domain. Further the expression $H^p = [h_1^p, h_2^p, \ldots, h_{mp}^p] \in \{-1,1\}^{rp \times mp}$ is the hash code matrix (e.g., see first hash table 220 in FIG. 2) for the data in the p-th domain, with $h_i^p$ being the hash code vector for $v_i^p$. In addition, $R^p \in R^{mp \times mp}$ denotes the homogenous relationship matrix between the p-th domain and the q-th domain.

It can be assumed that $H^p$ can be mapped to $H^q$ via a linear mapping $W^{PQ} \in R^{rp \times rq}$. The goal of RaHH is to obtain the optimal $\{H^P\}_{p=1}^P$ and $\{W^{pq}\}_{p,q=1}^P$ via solving the optimization problem represented by the below equation 1.

$$\min_{\{H^P\}_{p=1}^P, \{W^{pq}\}_{p,q=1}^P} \mathcal{J}^{ho}(\{H^P\}) + \beta \mathcal{J}^{he}(\{H^P\}, \{W^{pq}\}) \quad (1)$$

$$\text{s.t. } H^p \in \Omega^p, \forall\ p = 1, 2, \ldots, P.$$

Here $\mathcal{J}^{ho}$ is the homogenous loss term and $\mathcal{J}^{he}$ is the heterogeneous loss term. The term $\beta > 0$ is the tradeoff parameter and the term $\Omega^P$ is the set imposing constraints on $H^p$.

In an exemplary embodiment, $\mathcal{J}^{ho}$ is constructed by assuming that: (1) data objects with similar individual features are similar to each other; (2) data objects with strong relationships are similar to each other; and (3) similar data objects tend to have similar hash codes. For item (1), one can use the data inner product matrices $\{(X^P)^T X^P | p=1, 2, \ldots, P\}$ as the feature based similarity matrices for each domain if it is assumed the data in all domains is normalized to unit norm. For item (2), one can use the homogeneous relationship matrix $R^p$ to capture the data similarity. Then one can construct the following composite data similarity matrix to encode the pairwise data similarities (e.g., see Equation 2 below).

$$A^p = (X^p)^T X^p + \alpha R^p, \quad (2)$$

where the constant $\alpha > 0$ is the combination weight.

For item (3), one can construct a smoothness term for the data hash codes to enforce that similar data would have similar codes. In an exemplary embodiment, $\mathcal{J}^{ho}$ is designed according to the following equation 3.

$$\mathcal{J}^{ho}(\{H^p\}) = \frac{1}{2} \sum_{p=1}^{P} \sum_{i,j=1}^{m_p} A_{ij}^p \|h_i^p - h_j^p\|^2, \quad (3)$$

where $A_{ij}^p$ is the (i,j)-th element of $A^p$. When minimizing $\mathcal{J}^{ho}(\{H^p\})$, a larger $A_{ij}^p$ will cause a closer $h_i^p$ and $h_j^p$. In an exemplary embodiment, the constraint set $\Omega^p$ is constructed according to the following equation 4.

$$\Omega^p = \{H^p | H^p \in \{-1,1\}^{rp \times mp}, H^p 1 = 0, H^p (H^p)^\perp = m_p I\} \quad (4)$$

The constraint $H^p 1 = 0$ can be imposed to preserve the balance of each bit, and in an exemplary embodiment, $H^p(H^p)^T = m_p I$ to enforce that different bits capture complimentary information.

As the data from multiple domains might be associated with different metric spaces, the similarity between heterogeneous items cannot be measured directly. To search similar items from relational domains, RaHH first assumes that the hash codes for a datum in domain p can be linearly mapped to the Hamming space of a relational domain q. Then the mapped hash codes are used to search nearest neighbors in the domain q. In an exemplary embodiment, RaHH maps $H^p$ to each bit (row) of $H^q$ respectively through utilizing the heterogeneous relation matrix $R^{pq} \in R^{mp \times mq}$. By treating $H^p$ as a feature matrix and $H_k^q$ as class labels, the mapping problem can be case as a series of binary classification problems where $\mathcal{J}^{he}(\{H^p\}, \{W^{pq}\})$ can be defined according to the following equation 5.

$$\mathcal{J}^{he}(\{H^p\}, \{W^{pq}\}) = \sum_{p \sim q} \sum_{k} \sum_{i,j} l_{ijk}^{pq} + \lambda \|w_k^{pq}\|^2, \quad (5)$$

where p~q indicates domain p has relationship with domain q, and the logistic loss is defined by the following equation 6.

$$l_{ijk}^{pq} = \ln(1 + e^{-R_{ij}^{pq} H_{kj}^q (w_k^{pq})^T h_i^p}) \quad (6)$$

The logistic loss measures the prediction loss after the hash code of $v_i^p$ is mapped to the k-th bit on the q-th domain. To minimize the loss, $H_{kj}^q$ and $(w_k^{pq})^T h_i^p$ needs to be close for a large $R_{ij}^{pq}$, which suggests that for strongly associated $v_i^p$ and $v_j^q$, the mapped hash codes of $v_i^p$ in the domain q should be as similar as the hash code of $v_j^q$.

By bringing Eq. (3), Eq. (4) and Eq. (5) together into the original cost function defined in Eq. (1), one can derive the final cost function. Due to the binary constraint expressed in $\Omega^p$, the cost function in Eq. (1) is not differentiable. Moreover, the balance constraint also makes problem 1 NP hard to solve. Therefore, in an exemplary embodiment of the invention, hard constraints are relaxed and converted into soft penalty terms. In an exemplary embodiment of the invention, three regulators are added to the cost function as shown by the following equations 7-9.

$$\theta_1(\{H^p\}) = \sum_{p=1}^{P} \|H^p \odot H^p - E\|_F^2 \quad (7)$$

$$\theta_2(\{H^p\}) = \sum_{p=1}^{P} \|H^p 1\|^2 \quad (8)$$

$$\theta_3(\{H^p\}) = \sum_{p=1}^{P} \|H^p(H^p)^T - m_p I\|_F^2, \quad (9)$$

where $E \in \mathbb{R}^{r_p \times m_p}$ is an all-one matrix, $1 \in \mathbb{R}^{m_p \times 1}$ is an all-one vector, and I is an identity matrix. These three regularizers correspond to the three relaxed constraint sets in $\{\Omega^p\}$. Then the relaxed version of the original cost function is represented by the following equation 10.

$$\mathcal{J} = \mathcal{J}^{ho}(\{H^p\}) + \beta \mathcal{J}^{he}(\{H^p\}, \{W^{pq}\}) + \gamma_1 \theta_1(\{H^p\}) + \gamma_2 \theta_2(\{H^p\}) + \gamma_3 \theta_3(\{H^p\}) \quad (10)$$

To minimize the above cost $\mathcal{J}$, a Block Coordinate Descent (BCD) approach can be used.

Since the final cost function in Eq. (10) is not jointly convex with respect to all the variables, here we use the BCD method can be used to search a local optimal solution. In an exemplary embodiment, the gradients are calculated according to the following equations 11 and 12.

$$\frac{\partial \mathcal{J}}{\partial w_k^{pq}} = \sum_i \sum_j \frac{-R_{ij}^{pq} H_{kj}^q h_i^p}{1 + e^{R_{ij}^{pq} H_{kj}^q (w_k^{pq})^T h_i^p}} + 2\lambda w_k^{pq} \quad (11)$$

$$\frac{\partial \mathcal{J}}{\partial H_{ki}^p} = \frac{\partial \mathcal{J}^{ho}(\{H^p\})}{\partial H_{ki}^p} + \beta \frac{\partial \mathcal{J}^{he}(\{H^p\}, \{W^{pq}\})}{\partial H_{ki}^p} + \gamma_1 \frac{\partial \theta_1(\{H^p\})}{\partial H_{ki}^p} + \gamma_2 \frac{\partial \theta_2(\{H^p\})}{\partial H_{ki}^p} + \gamma_3 \frac{\partial \theta_3(\{H^p\})}{\partial H_{ki}^p} \quad (12)$$

Figure 3:
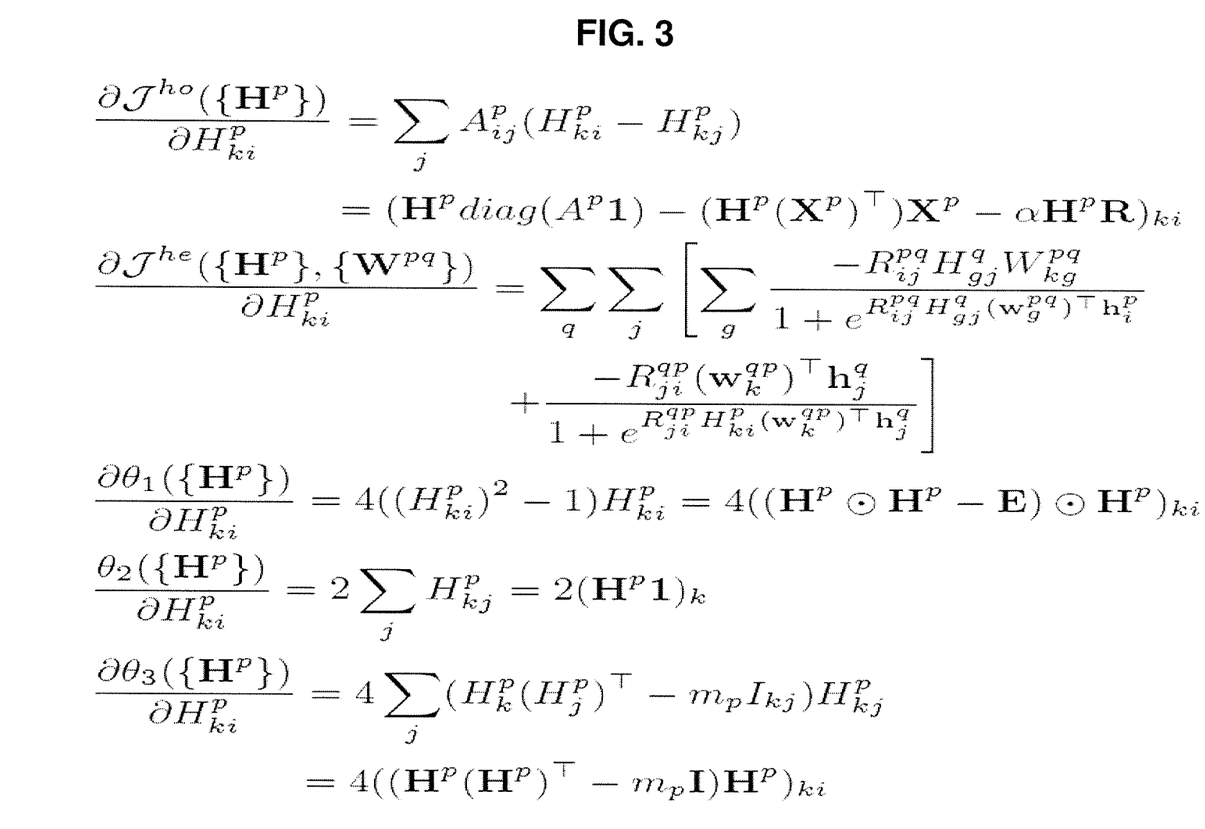
FIG. 3 illustrates gradient components.

The gradient components in Eq. (12) are given by the expression illustrated in FIG. 3. The expressions $\{H^p(X^p)^T\}$, $\{H^p 1\}$ and $\{(H^p(H^p)^T - mpI)\}$ are three statistics denoted by S, which will be used to accelerate the optimization algorithm.

The objective function can be iteratively updating H and W until the value of the objective function converges.

Figure 4:
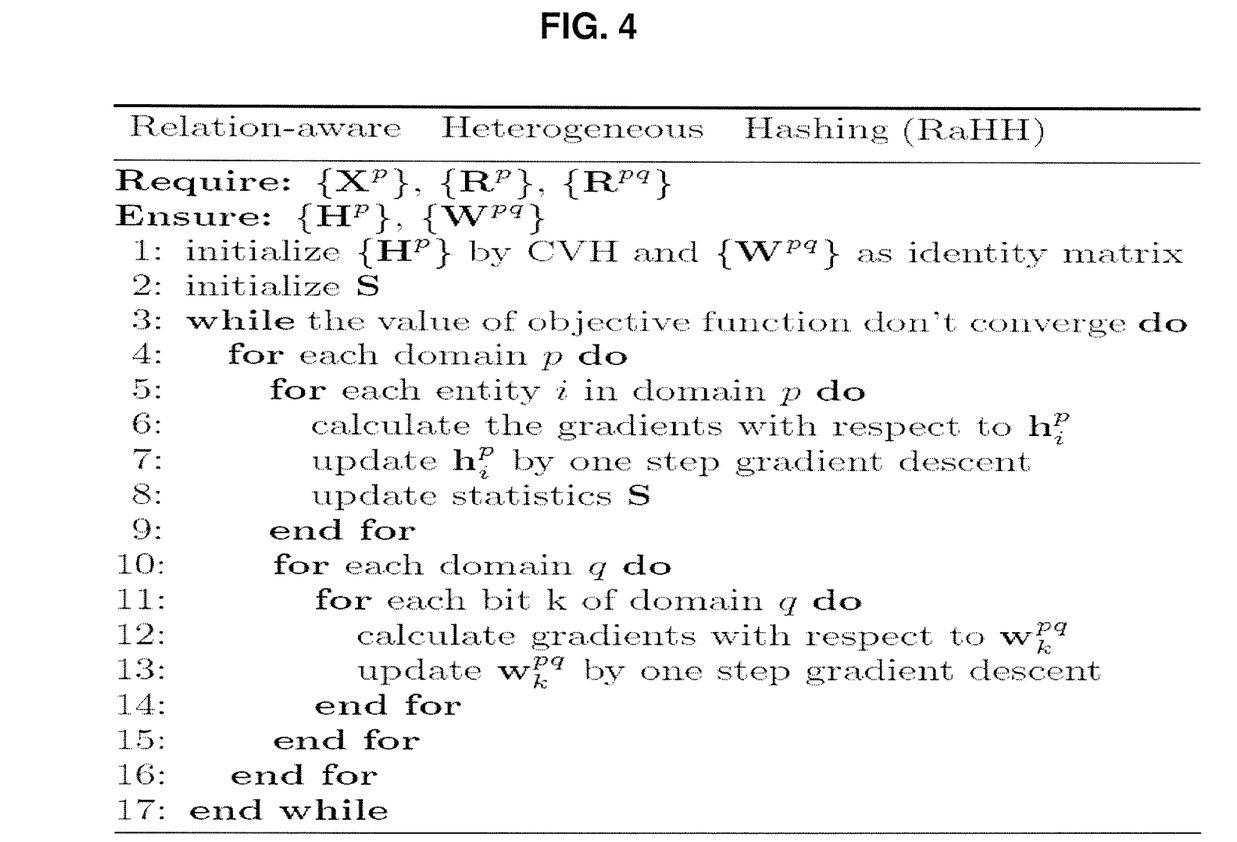
FIG. 4 illustrates pseudocode for performing Relation-aware Heterogeneous Hashing (RaHH) according to an exemplary embodiment of the invention.

FIG. 4 illustrates pseudocode for performing Relation-aware Heterogeneous Hashing (RaHH) according to an exemplary embodiment of the invention.

The out of sample extension can be derived for computing the hash code for any query datum in an online setting. In the formulation of the proposed RaHH, the hash codes can be computed for an out-of-sample entity $v_i^p$ by minimizing Eq. (10). Since the hash tables are constructed and the mappings $\{W^{pq}\}_{p,q=1}^{P}$ are learned during the offline training process, one only needs to minimize the cost in Eq. (10) with respect to the new entry $v_i^p$. A gradient descent can be applied to efficiently compute the optimal hash code for the entity $v_i^p$.

Figure 5:
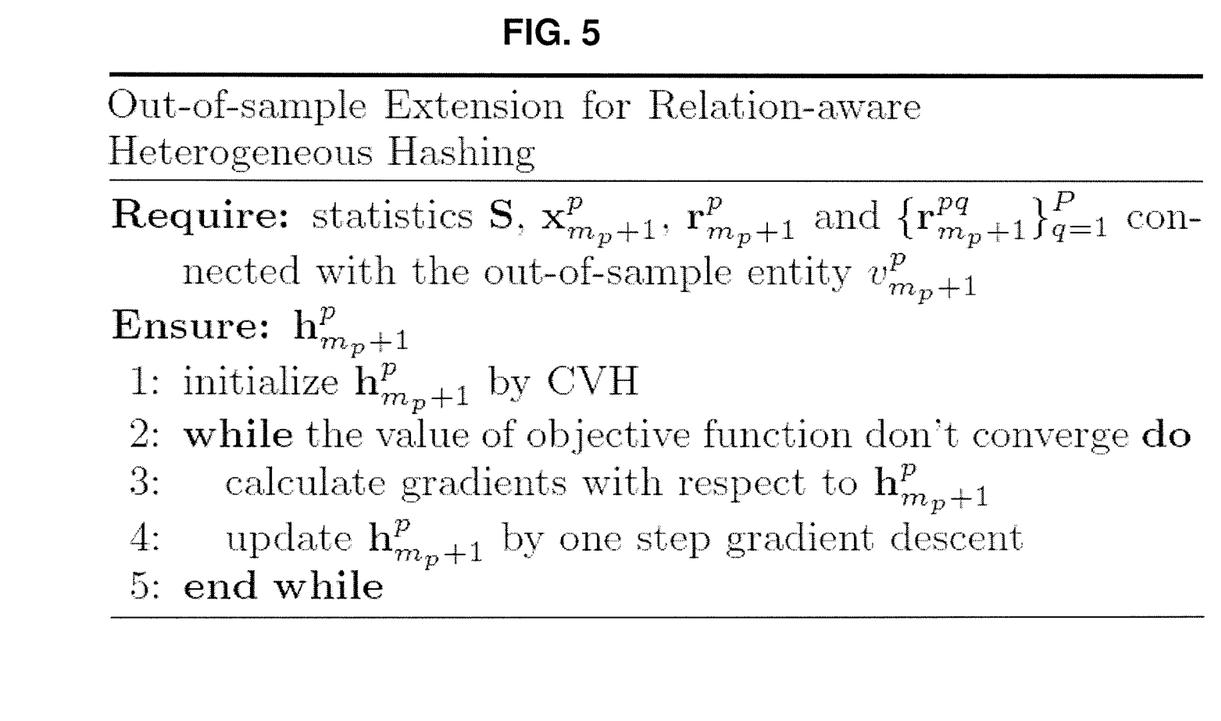
FIG. 5 illustrates pseudocode for performing an out of sample extension according to an exemplary embodiment of the invention.

FIG. 5 illustrates pseudocode for performing the out of sample extension according to an exemplary embodiment of the invention.

Figure 6:
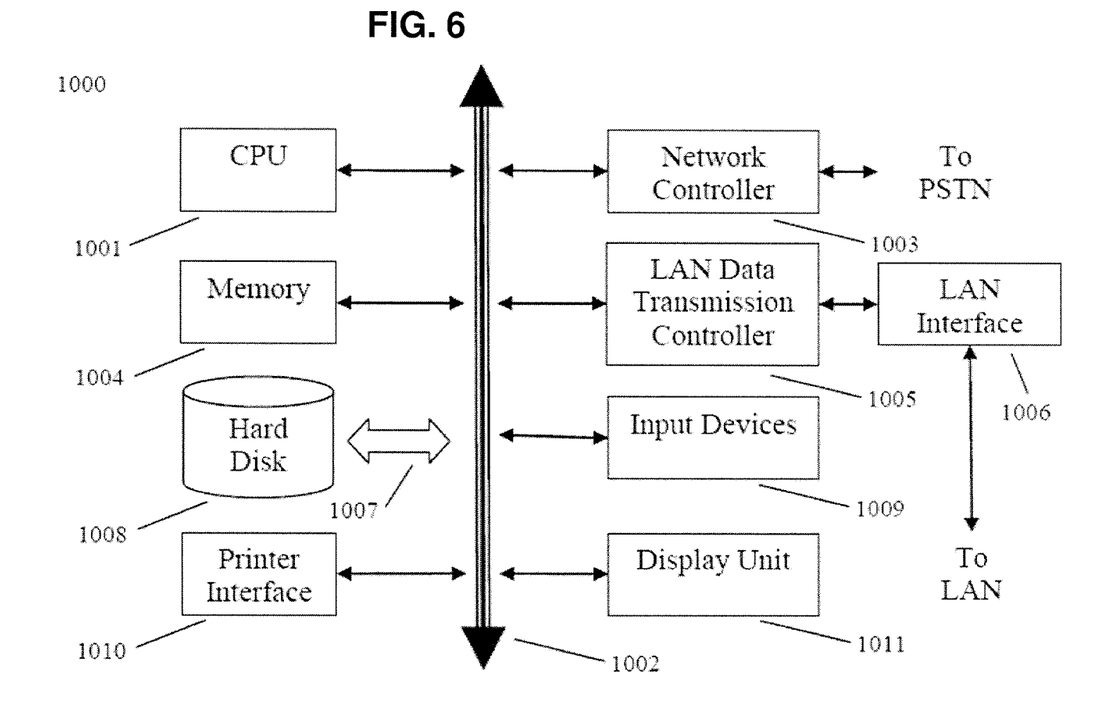
FIG. 6 illustrates an example of a computer system capable of implementing methods and systems according to embodiments of the disclosure.

FIG. 6 illustrates an example of a computer system, which may execute any of the above-described methods, according to exemplary embodiments of the invention. For example, the method of FIG. 1, the hash functions of FIG. 2, the pseudo code of FIG. 4, and the pseudo code of FIG. 5 may be implemented in the form of a software application running on the computer system. Further, portions of the methods may be executed on one such computer system, while the other portions are executed on one or more other such computer systems. Examples of the computer system include a mainframe, personal computer (PC), a handheld computer, a server, etc. The software application and the hash tables of FIG. 1 and FIG. 2 may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for performing a search of heterogeneous data based on an input query, the computer program product comprising a non-transitory computer readable storage medium having program code embodied therewith, the program code executable by a processor, to perform method steps comprising instructions for:
    generating an index comprising at least two hash tables, where each hash table corresponds to a different data domain of the heterogeneous data and comprises hash code sets, where at least one of the hash code sets is mapped to a hash code set of another one of the tables;
    performing a hash on the input query to generate a hash code;
    by referring to the index, determining a first hash code set that the generated hash code belongs to, and determining a second hash code set that the determined first hash code set is mapped to; and
    providing at least one result based on the determined second hash code set,
    wherein a first one of the data domains is user data identifying a plurality of users and a second one of the data domains comprises posts by users on the WEB.

2. The computer program product of claim 1, wherein generating the index comprises:
    analyzing one of the data domains to classify the corresponding data domain into at least two data sub-domains;
    generating a hash function for each classified data sub-domain that hashes data of the corresponding data sub-domain into a unique set of hash codes; and
    creating the hash table corresponding to the one data domain comprising an element for each data sub-domain, where each element comprises the corresponding set of hash codes for that data sub-domain.

3. The computer program product of claim 1, wherein the providing provides data identified by the second hash code set.

4. The computer program product of claim 2, wherein performing the hash comprises:
    determining which of the data sub-domains data of the input query is part of; and applying the hash function of the determined data sub-domain to the data of the input query.

5. The computer program product of claim 1, wherein the posts include images.

6. The computer program product of claim 1, wherein the input query includes at least one of i) an identifier of one of the users and ii) data of one of the posts.

7. A computer program product for generating an index to perform a search of heterogeneous data based on an input query, the computer program product comprising a non-transitory computer readable storage medium having program code embodied therewith, the program code executable by a processor, to perform method steps comprising instructions for:
   determining first and second data sub-domains from a first data domain;
   generating a first hash function that hashes data of the first data sub-domain to a first set of hash codes and a second hash function that hashes data of the second data sub-domain to a second set of hash codes that is different from the first set;
   generating a first hash table comprising a first element comprising the first set of hash codes and a second element comprising the second set of hash codes;
   generating a second hash table that comprises hash codes of data from a second data domain different from the first data domain; and
   mapping one of the elements of the first hash table to a hash code of the second hash table,
   wherein the first data domain is user data identifying a plurality of users and the second data domain is posts by users on the WEB.

8. The computer program product of claim 7, wherein the generating of the second hash table comprises:
   determining third and fourth data sub-domains from the second data domain;
   generating a third hash function that hashes data of the third data sub-domain to a third set of hash codes and a fourth hash function that hashes data of the fourth data sub-domain to a fourth set of hash codes different from the third set; and
   generating the second hash table to comprise a third element including the third set of hash codes and a fourth element including the fourth set of hash codes.

9. The computer program product of claim 8, wherein the first data sub-domain are the users that have a first characteristic and the second data sub-domain are the users that have a second other characteristic.

10. The computer program product of claim 7, wherein each set of hash codes is a contiguous sequential series of numerical codes.

11. The computer program product of claim 9, wherein the third data sub-domain are the posts that have the first characteristic and the fourth data sub-domain are the posts that have the second characteristic.

12. The computer program product of claim 7, wherein the posts include images, and the characteristics are based on features extracted from the images.

13. The computer program product of claim 7, wherein the input query includes at least one of i) an identifier of one of the users and ii) data of one of the posts.

14. A computer system configured to generate an index to perform a search of heterogeneous data based on an input query, the system comprising:
   a memory storing the index and a computer program, wherein the index comprises a first hash table and a second hash table; and
   a processor configured to execute the computer program, wherein the computer program determines first and second data sub-domains from a first data domain, generates a first hash function that hashes data of the first data sub-domain to a first set of hash codes and a second hash function that hashes data of the second data sub-domain to a second set of hash codes that is different from the first set, generates the first hash table comprising a first element comprising the first set of hash codes and a second element comprising the second set of hash codes, generates the second hash table that comprises hash codes of data from a second data domain different from the first data domain, and maps one of the elements of the first hash table to a hash code of the second hash table,
   wherein the first data domain is user data identifying a plurality of users and the second data domain is posts by users on the WEB.

15. The computer system of claim 14, wherein the program generates the second hash table by determining third and fourth data sub-domains from the second data domain, generating a third hash function that hashes data of the third data sub-domain to a third set of hash codes and a fourth hash function that hashes data of the fourth data sub-domain to a fourth set of hash codes different from the third set, and generating the second hash table to comprise a third element including the third set of hash codes and a fourth element including the fourth set of hash codes.

16. The computer system of claim 15, wherein the first data sub-domain are the users that have a first characteristic and the second data sub-domain are the users that have a second other characteristic.

17. The computer system of claim 16, wherein the third data sub-domain are the posts that have the first characteristic and the fourth data sub-domain are the posts that have the second characteristic.

18. The computer system of claim 14, wherein each set of hash codes is a contiguous sequential series of numerical codes.

19. The computer system of claim 14, wherein the posts includes images, and the characteristics are based on features extracted from the images.

20. The computer system of claim 14, wherein the input query includes at least one of i) an identifier of one of the users and ii) data of one of the posts.

* * * * *